United States Patent
Yaske et al.

(10) Patent No.: US 8,997,447 B2
(45) Date of Patent: Apr. 7, 2015

(54) SUSPENSION SYSTEM FOR WHEEL RAKES

(75) Inventors: Michael Yaske, Knoxville, IA (US);
Kent L. Thompson, Otley, IA (US);
Kent Van Kooten, Pella, IA (US);
Rustin V. Bentzinger, Pella, IA (US)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/350,124

(22) Filed: Jan. 13, 2012

(65) Prior Publication Data

US 2012/0186216 A1    Jul. 26, 2012

Related U.S. Application Data

(60) Provisional application No. 61/433,401, filed on Jan. 17, 2011.

(51) Int. Cl.
| | | |
|---|---|---|
| *A01D 76/00* | (2006.01) | |
| *A01D 78/00* | (2006.01) | |
| *A01D 80/00* | (2006.01) | |
| *A01D 84/00* | (2006.01) | |
| *A01D 78/14* | (2006.01) | |

(52) U.S. Cl.
CPC ..................... *A01D 78/14* (2013.01)

(58) Field of Classification Search
USPC ........ 56/375, 377, 396, 400, 367; 172/2, 140, 172/430, 699; 111/63, 140, 143
See application file for complete search history.

(56) References Cited

U.S. PATENT DOCUMENTS

| | | | |
|---|---|---|---|
| 2,827,754 A |   | 3/1958 | Hill |
| 3,700,041 A | * | 10/1972 | Ryan .............................. 172/316 |
| 3,834,142 A | * | 9/1974 | Johnston et al. ................ 56/377 |
| 4,506,898 A | * | 3/1985 | Herron ........................ 280/43.23 |
| 4,932,197 A |   | 6/1990 | Allen |
| 5,199,252 A | * | 4/1993 | Peeters ............................ 56/377 |
| 5,305,590 A | * | 4/1994 | Peeters ............................ 56/377 |
| 5,499,685 A | * | 3/1996 | Downing, Jr. ................. 172/699 |
| 5,685,135 A | * | 11/1997 | Menichetti ....................... 56/365 |
| 5,918,452 A | * | 7/1999 | Kelderman ...................... 56/377 |
| 5,966,916 A | * | 10/1999 | Laing .............................. 56/377 |
| 6,220,008 B1 | * | 4/2001 | Rowse et al. .................... 56/377 |
| 6,543,212 B2 | * | 4/2003 | Tonutti ............................ 56/375 |
| 6,606,956 B1 | * | 8/2003 | Paluch .......................... 111/200 |
| 6,691,629 B2 | * | 2/2004 | Paluch et al. ................... 111/56 |
| 7,350,347 B2 | * | 4/2008 | Staheli ............................ 56/396 |
| 7,596,935 B2 |   | 10/2009 | Bollinger et al. |
| 7,673,570 B1 | * | 3/2010 | Bassett ........................... 111/63 |
| 8,146,338 B1 | * | 4/2012 | Cicci et al. ...................... 56/377 |
| 8,186,140 B1 | * | 5/2012 | Cicci et al. ...................... 56/377 |

(Continued)

FOREIGN PATENT DOCUMENTS

| | | |
|---|---|---|
| EP | 2055171 | 5/2009 |
| FR | 1203119 | 1/1960 |
| WO | 2012/099459 | 7/2012 |

OTHER PUBLICATIONS 10-pages of International Search Report for PCT/NL2012/000008.

*Primary Examiner* — Árpád Fábián-Kovács

(74) *Attorney, Agent, or Firm* — Armstrong Teasdale LLP

(57) ABSTRACT

A suspension system for forage rakes having at least one floating forage rake wheel has a hydraulic cylinder is used for both lift and suspension of the floating forage rake wheel. A hydraulic accumulator provides expansion room for hydraulic fluid to move in and out of the hydraulic cylinder during suspension.

11 Claims, 10 Drawing Sheets

(56) References Cited

U.S. PATENT DOCUMENTS

| | | | |
|---|---|---|---|
| 2006/0191695 A1* | 8/2006 | Walker et al. | 172/452 |
| 2007/0163223 A1* | 7/2007 | Hruska et al. | 56/375 |
| 2008/0093093 A1* | 4/2008 | Sheppard et al. | 172/2 |
| 2008/0256916 A1* | 10/2008 | Vaske et al. | 56/13.5 |
| 2011/0232550 A1* | 9/2011 | Van Buskirk et al. | 111/14 |
| 2012/0060730 A1* | 3/2012 | Bassett | 111/149 |
| 2012/0060731 A1* | 3/2012 | Bassett | 111/149 |
| 2012/0210919 A1* | 8/2012 | Van Buskirk et al. | 111/139 |
| 2012/0305274 A1* | 12/2012 | Bassett | 172/5 |
| 2012/0312568 A1* | 12/2012 | Van Buskirk et al. | 172/140 |
| 2013/0032363 A1* | 2/2013 | Curry et al. | 172/4 |
| 2013/0112121 A1* | 5/2013 | Achen et al. | 111/14 |
| 2013/0133904 A1* | 5/2013 | Bassett | 172/239 |
| 2013/0146318 A1* | 6/2013 | Bassett | 172/5 |
| 2013/0192186 A1* | 8/2013 | Bassett | 56/10.2 E |
| 2013/0199808 A1* | 8/2013 | Bassett | 172/260.5 |
| 2013/0213676 A1* | 8/2013 | Bassett | 172/260.5 |
| 2013/0248212 A1* | 9/2013 | Bassett | 172/4 |
| 2013/0264078 A1* | 10/2013 | Bassett | 172/260.5 |
| 2013/0306337 A1* | 11/2013 | Bassett | 172/260.5 |
| 2014/0048297 A1* | 2/2014 | Bassett | 172/4 |
| 2014/0076592 A1* | 3/2014 | Van Buskirk et al. | 172/1 |
| 2014/0116735 A1* | 5/2014 | Bassett | 172/2 |

* cited by examiner

Intermediate Float

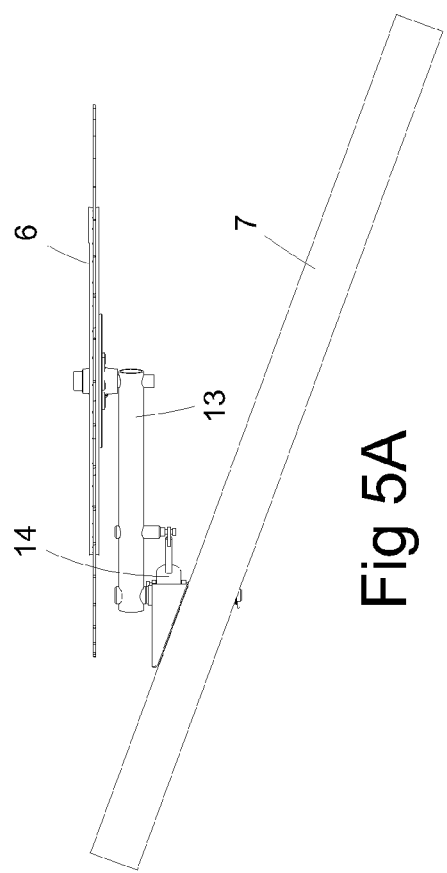
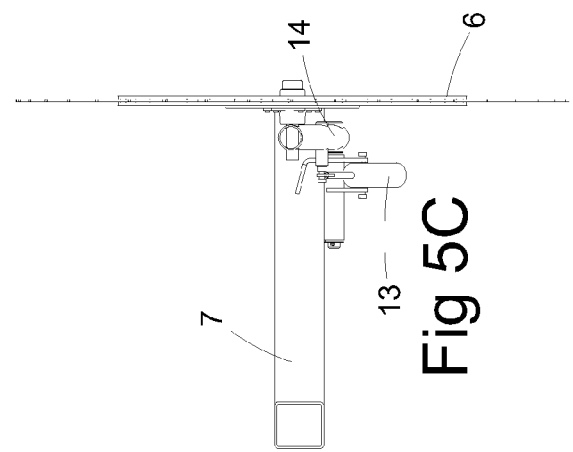
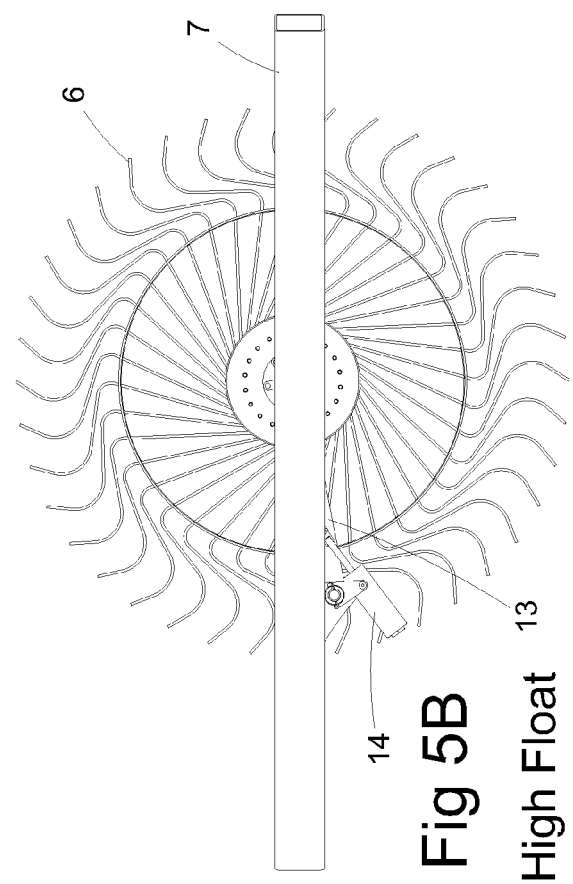

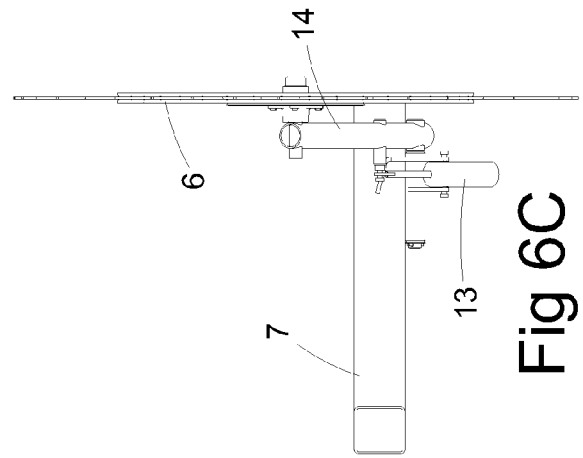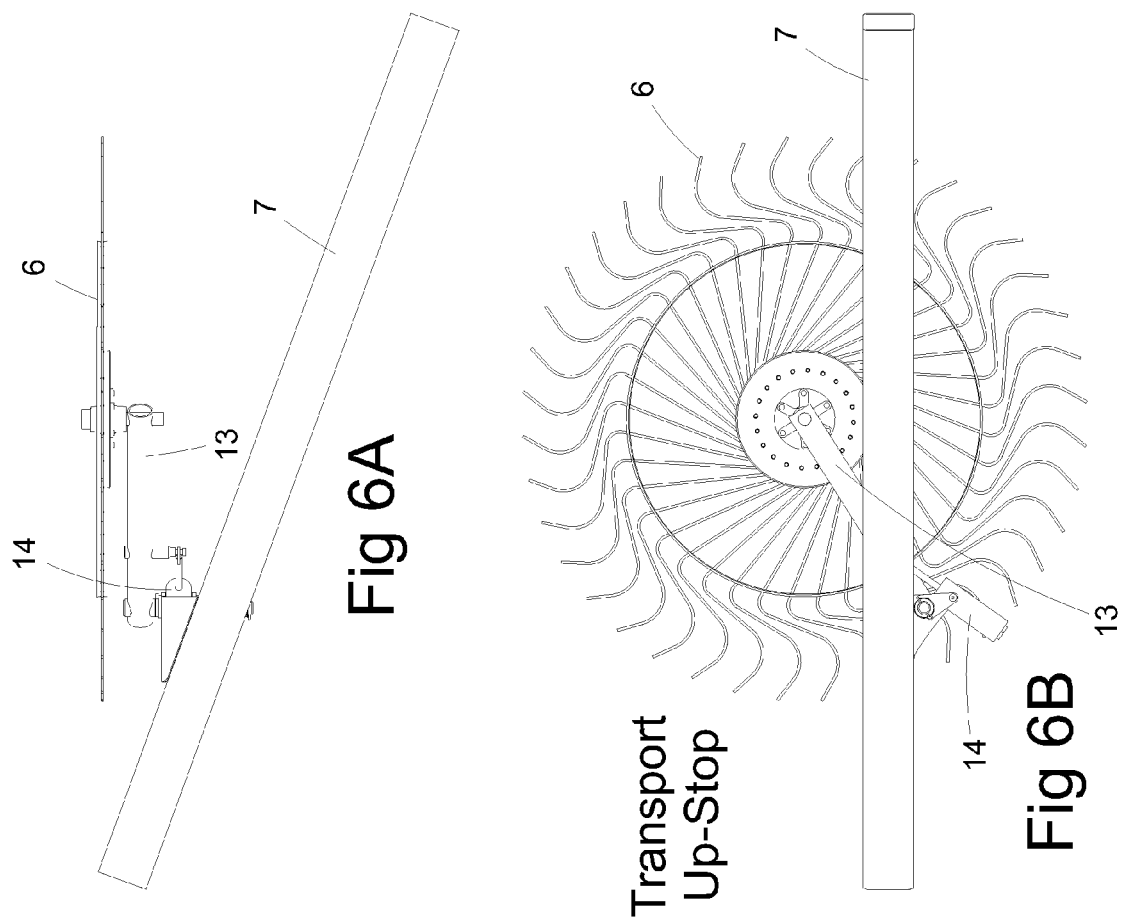

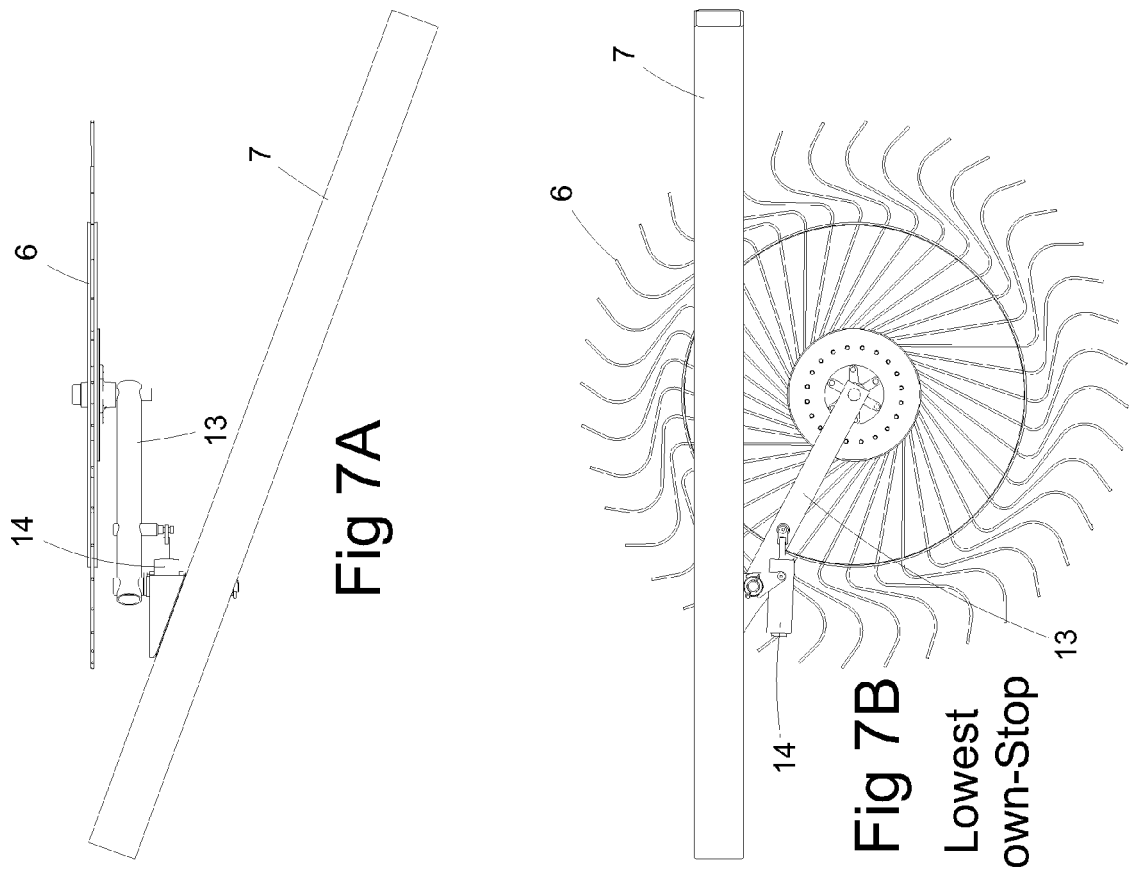

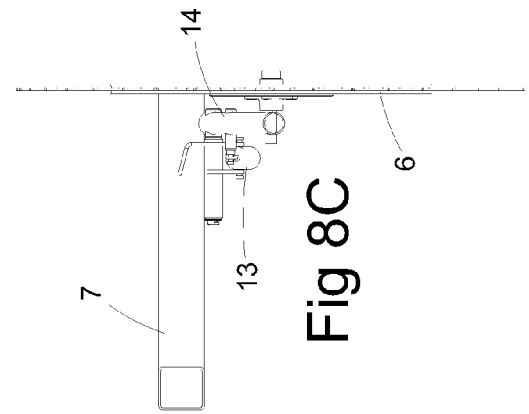
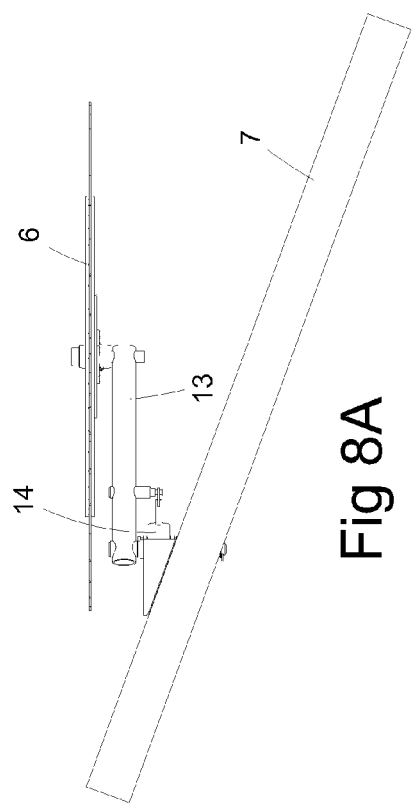
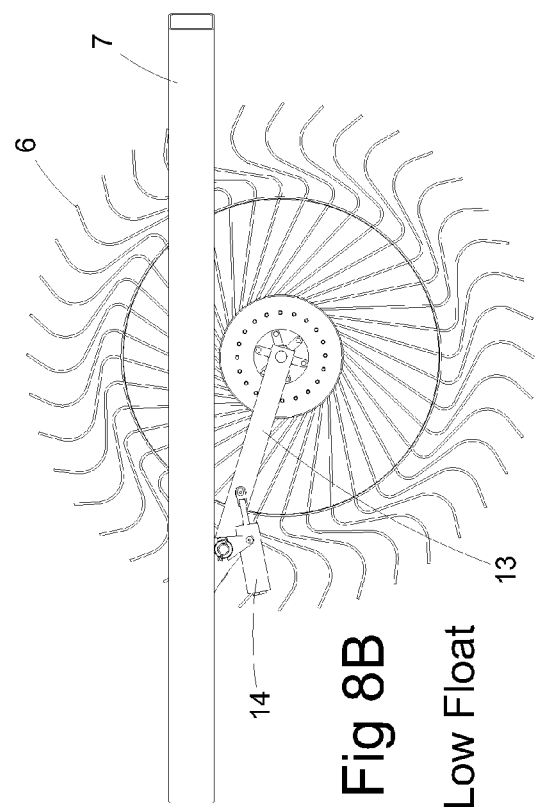

|  | Spring | Cylinder |
|---|---|---|
| Maximum Weight, lbs | 47.2 | 21.8 |
| Minimum Weight, lbs | 0 | 9 |
| Difference (max - min) | 47.2 | 12.8 |
| % Change from maximum weight | 100% | 27% |

FIG. 10

SUSPENSION SYSTEM FOR WHEEL RAKES

CROSS REFERENCE TO RELATED APPLICATIONS

U.S. patent application Ser. No. 11/928,010 filed Oct. 30, 2007, now U.S. Pat. No. 7,596,935, is hereby incorporated herein by reference in its entirety.

Priority is claimed to U. S. Provisional Patent Application Ser. No. 61/433,401 filed Jan. 17, 2011, which is also incorporated herein by reference in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to wheel rakes. More particularly, the present invention relates to an improved suspension system for rakes having one or more floating rake wheels wherein the suspension hydraulic cylinders are also used to lift for transport.

2. Background Art

Some prior art wheel rakes use coil springs in tension to apply a lift force onto each rake wheel in an attempt to get each rake wheel to "float". The term ground force in this specification is intended to describe the force equal to the lift force subtracted from the weight of the individual rake wheel. If the lift force is equal to the weight of the rake wheel the ground force will be equal to zero. If the lift force exceeds the weight of the rake wheel, as can occur in a dynamic condition, the ground force will be negative, causing the rake wheel to be accelerating upward. If the lift force is zero, then the ground force is equal to the weight of the rake wheel. The prior art arrangement results in the situation that as each rake wheel is lifted up the ground force changes dramatically, because its respective spring is quite linear in force as it is stretched. It is common for the ground force to vary from zero, to the full weight of the rake wheel within 6 to 8 inches of travel. This application of uneven force of each rake wheel against the ground is, of course, undesirable.

Prior art wheel rakes also used a system of push tubes or push or pull tubes to move the rake wheels from an operating position to a transport position. Those systems were always notoriously prone to bending, flexing and often were the cause of breakdowns, which also is a problem.

Another problem relating to large wide rakes is that they do not have flex joints in them. Thus, when the wheels passed over a low spot, in areas where there is irregular terrain, these large rakes will still miss picking up the crop because one or more of the rake wheels will not go low enough in a dip in the field.

In prior art rakes that use a chain to limit up and down limits of each individual rake wheel, each individual one of the chain links on the machine needs to be adjusted separately at the beginning of the raking process and if during use it appears that the adjustments were not optimum, then each one needs to be adjusted again in a fine tuning process. This process may need to be repeated at other times too, when conditions change.

Another problem with the prior art system of using chains to limit the up and down movement of each individual rake wheel is that the parts are loose causing rattling noises during transport from place to place and to some extent even during use in the raking process.

There is, therefore, a need for providing an improved suspension system for rake wheel rakes on a raking implement.

SUMMARY OF THE INVENTION

An object of the present invention is to provide a suspension system for rake wheels attached to a tool bar of a rake which will permit a floating rake wheel to contact the ground with an appropriate force.

Another object of this invention is to provide the suspension using the same hydraulic cylinders used to lift the rake wheels.

A hydraulic accumulator is used to allow for changes in a hydraulic cylinder's extension during operation.

A take-up cylinder is incorporated with a lift/flotation cylinder for each rake wheel, and the hydraulic accumulator, to raise and lower the rake wheels. When the take-up cylinder is fully retracted, the hydraulic accumulator and the lift/flotation cylinders have reached their greatest pressure, and the lift/flotation cylinders have reached their full extension when the rake wheels are fully raised.

A valve is then opened slightly to allow the hydraulic accumulator to depressurize and the take-up cylinder to extend somewhat with the rake wheels under the force of gravity. When a predetermined pressure is achieved in the hydraulic accumulator, the valve is again closed. At this predetermined pressure, the individual rake wheels will bear on the ground surface with the desired force.

The present invention relates to a suspension system for each individual rake wheel that uses a hydraulic cylinder for each rake wheel and a common accumulator arrangement to provide an adjustable ground force of the rake wheel. While in the prior art this would normally be done with a mechanical spring, the present invention allows a more uniform floatation force through out the entire range of travel of the rake wheel. The preferred embodiment utilizes a suspension system that includes a hydraulic system and a mechanical linkage. The hydraulic system includes a common accumulator, a common take-up cylinder and an individual cylinder for each rake wheel. The mechanical linkage provides geometry that orients the individual hydraulic cylinder to a mount arm for each rake wheel to minimize the variation of the flotation force. It is desirable to reduce the variation of the ground force through the range of travel expected in operating conditions, to about five or ten pounds. The design of the hydraulic system additionally provides the ability to allow the operator to adjust the ground force by changing the hydraulic pressure in the system.

This is an improvement over prior art rakes that use coil springs instead of hydraulic cylinders because the force of a tension spring increases the more it is lengthened, instead of being able to maintain substantially the same force on each individual rake wheel from the lowest position of the rake wheel to the highest position of the rake wheel as is possible in the present invention.

Another advantage of the present invention compared to using a prior art system of push tubes or push-pull tubes was to lift the rake wheels as they slid in tubes. These tubes were prone to bend, flex and often even to break, but the instant invention, in contrast, has a hydraulic hose which merely flexes and avoids that problem.

Another advantage of the present invention is that there is a built-in "up-stop" when the hydraulic cylinder is extended as far as possible as shown in FIG. 6B and a built-in "down-stop" when the hydraulic cylinder is as short as possible, as shown in FIG. 7B whereas in the prior art chain system there are many elements that rattle because those parts are not held tightly with chains like they are in the present invention with hydraulic cylinders. So in the present invention, the cylinder itself operates as a tight up-stop and a tight down-stop inherently.

One of the problems with most very large wheel rakes is that because they do not have flex joints in them, they will miss picking up the crop in places. In contrast, in the instant invention that is not a problem because each rake wheel can just individually go up and down to conform to the contour of the ground.

The present invention has an adjusting needle valve on the front of the tongue to adjust the pressure. With this arrangement all of the rake wheels can be adjusted at one time when the tractor is running To do this a needle valve is opened to charge the entire system. After that, the needle valve is closed and tractor is shut off or put in "float". After that, the fluid is bled off slowly, causing the rake wheels to slowly go [bleed] down. When the rake wheels just touch the ground during this process the adjusting needle valve is closed. At that time the wheel rake is ready to use. If it is desired to make each rake wheel float with less down pressure, less fluid is bled off whereas if it is desired to make each rake wheel have more down pressure, more oil is bled off, illustrating how easy it is to adjust the entire rake with one set-up, as contrasted with a prior art wheel rake where each rake wheel suspension needs to be individually adjusted.

Other objects, advantages and novel features of the present invention will become apparent from the following detailed description of the invention when considered in conjunction with the accompanying drawings.

BRIEF DESCRIPTION OF THE DRAWINGS

FIG. 5A is a top view of one of the rake wheels in an elevated raised position shown in FIG. 5B and showing how it is attached to a tool bar with a hydraulic cylinder suspension;

FIG. 5B is a side elevational view of the rake wheel in a raised "high float" position shown in FIG. 5A and showing how the rake wheel and mounting arm and hydraulic cylinder are connected to the tool bar using the hydraulic cylinder;

FIG. 5C is a view of the structure and showing how the rake wheel and mounting arm and hydraulic cylinder are connected to the tool bar using the hydraulic cylinder with the rake wheel in a raised position as shown in FIGS. 5A and 5B looking perpendicular to a plane in which the rake wheel lies;

FIG. 6A is a top view of one of the rake wheels in an elevated raised position shown in FIG. 6B and showing how it is attached to a tool bar with a hydraulic cylinder suspension;

FIG. 6B is a side elevational view of the rake wheel in a raised "transport" position with the hydraulic cylinder extended as far as possible to form an automatic "up-stop" and showing how the rake wheel and mounting arm and hydraulic cylinder are connected to the tool bar using the hydraulic cylinder;

FIG. 6C is a view of the structure with the rake wheel in a raised position as shown in FIGS. 6A and 6B looking perpendicular to a plane in which the rake wheel lies;

FIG. 7A is a top view of one of the rake wheels in an elevated raised position shown in FIG. 7B and showing how it is attached to a tool bar with a hydraulic cylinder suspension;

FIG. 7B is a side elevational view of the rake wheel in the lowest position thereof with the hydraulic cylinder being as short as possible to form an inherent "down-stop" shown in FIG. 7A and showing how the rake wheel and mounting arm and hydraulic cylinder are connected to the tool bar using the hydraulic cylinder;

FIG. 7C is a view of the structure with the rake wheel in a raised position as shown in FIGS. 7A and 7B looking perpendicular to a plane in which the rake wheel lies;

FIG. 8A is a top view of one of the rake wheels in an elevated raised position shown in FIG. 8B and showing how it is attached to a tool bar with a hydraulic cylinder suspension;

FIG. 8B is a side elevational view of the rake wheel in a "float" position that is lower than in FIG. 4B, but higher than the position shown in FIG. 7B and showing how the rake wheel and mounting arm and hydraulic cylinder are connected to the tool bar using the hydraulic cylinder;

FIG. 8C is a view of the structure with the rake wheel in a raised position as shown in FIGS. 8A and 8B looking perpendicular to a plane in which the rake wheel lies; and FIGS. 9 and 10 are related to each other and are graph charts showing the estimated approximate ground force verses vertical wheel pressure force to compare the present invention using a hydraulic cylinder as compared to a wheel rake using springs for the rake wheels.

DETAILED DESCRIPTION OF THE INVENTION

Figure 1:
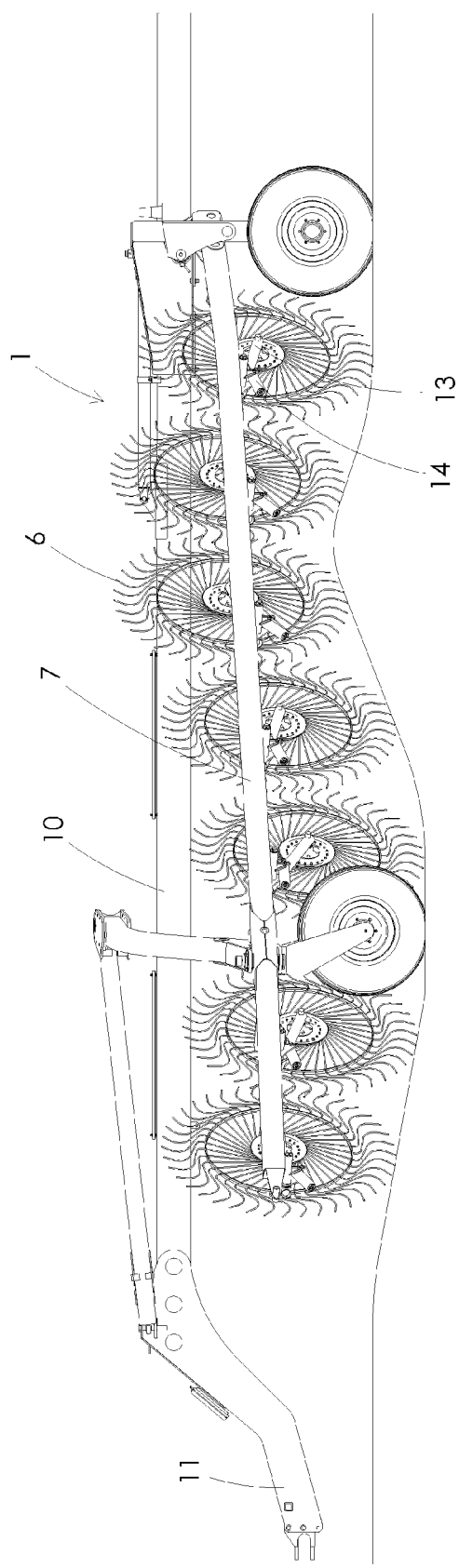
FIG. 1 is a first side elevational view of a towed agricultural rake having rake wheels with hydraulic suspension cylinders and showing how the rake wheels conform to the contours of the top of one place in a field in which it is being used.
Figure 2:
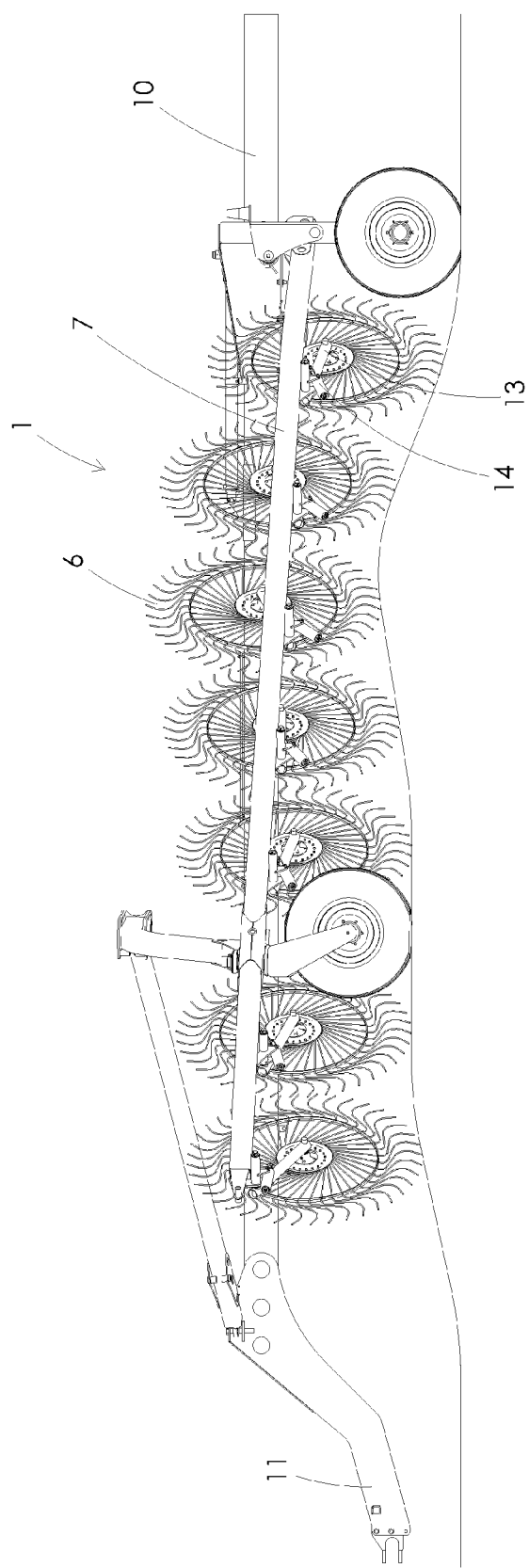
FIG. 2 is a second side elevational view of a towed agricultural rake having rake wheels with hydraulic suspension cylinders and showing how the rake wheels conform to the contours of the top of a second place in a field in which it is being used.

Referring now to the drawings wherein like reference numerals correspond to the same or similar parts throughout the drawings, the present invention includes a system for suspending rake wheels 6 from a tool bar 7 using hydraulic cylinders 14 and an accumulator 40 rake wheels 6. In FIGS. 1 and 2, a fixed-frame, towed rake 1 is equipped with one-way hydraulic suspension cylinders 14 located at the outer edges of the frame 10 and supporting the rake wheels 6 via pivoting links 13. The hydraulic cylinder 14 controls the orientation of the rake wheels 6 in relation to the ground. The tool bar 7 is attached to a rake frame 10 having a tongue 11 on the front end thereof, but the details of how the tool bar 7 is attached to the frame 10 forms no part of this invention.

Figure 3:
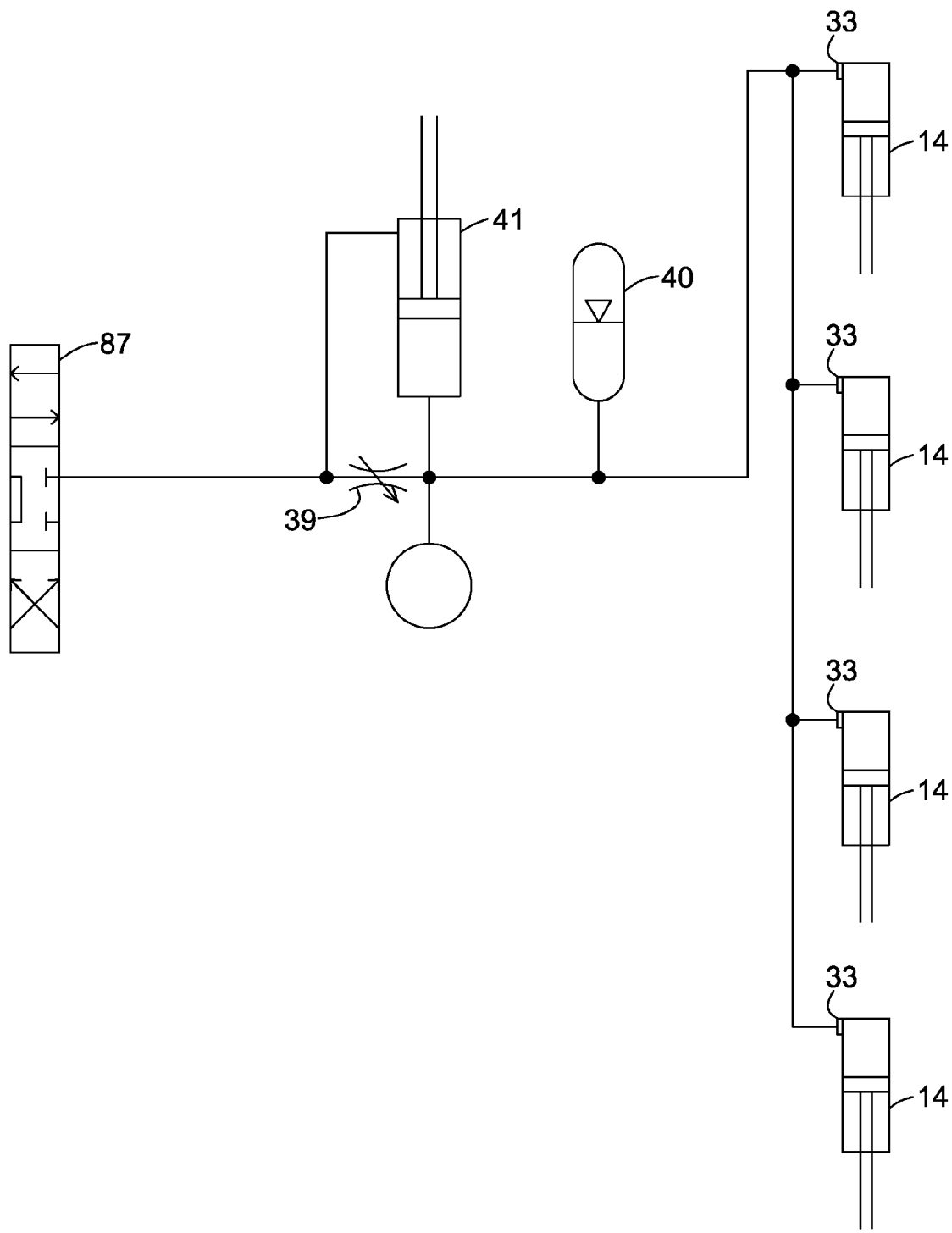
FIG. 3 is a schematic view of the hydraulic system of the preferred embodiment of the present invention.

FIG. 3 illustrates the hydraulic circuit, including a tractor remote valve 87, and the circuit for controlling hydraulic suspension cylinders 14. Flotation is provided by a hydro-pneumatic accumulator 40 used to exchange volumes of hydraulic fluid with the lift/flotation cylinders 14. This function is necessary when the rake wheels 6 are lowered, to allow the rake wheels 6 to follow the terrain, which occurs when the lift/flotation cylinders 14 are "floating", wherein they cooperate with the accumulator 40. An upper pressurized gas chamber of the hydro-pneumatic accumulator 40 is under pressure. The pressure is shared with a lower chamber of the hydro-pneumatic accumulator 40, open to the hydraulic system.

The rake wheel circuit also includes a take-up cylinder 41 and a valve 39. The take-up cylinder 41 controls the oil volume displaced for lifting and lowering the rake wheels. The valve 39 may be a manually operated ball valve that can be opened to allow flow, or closed to block flow. The valve 39 may alternatively be a solenoid operated valve capable of allowing flow when a solenoid is energized, and blocking flow then a solenoid is de-energized. However, the present invention is not limited to these types of valves. The functions of the valve 39 are described below.

In operation the towed rake 1 is hydraulically connected to a tractor (not shown) via valve 87 which provides a source of oil and is used to pump oil into the hydraulic systems of FIG. 3 to perform a variety of functions including:

1) to control the position of the rake wheels 6 relative to the ground, the tractor remote valve 87 is moved to one extreme position which will cause the rake wheels 6 to lift, and when moved to the other extreme position will cause the rake wheels 6 to lower, and when left in the middle position will hold the rake wheels 6 in a set position; and 2) charging the lift/flotation circuit.

Charging of the lift/flotation circuit of FIG. 3 is necessary in order to insure that the take-up cylinder 41, a component of the hydraulic system, yet not strictly speaking a part of the suspension system, is properly filled with oil. The lift/flotation cylinders 14 and the tractor remote valve 87 can be directly connected or isolated by use of the valve 39. As illustrated in FIG. 3, the valve 39 is set in a manifold at the base of the take-up cylinder 41. Charging is completed by allowing oil to flow through the valve 39, when opened, through the lines to the take-up cylinder 41, while first allowing air to escape at the take-up cylinder 41, and then to fully extend that cylinder 41, while also purging air out of the lines between the valve 39 and the lift/flotation cylinders 14. The tractor remote valve 87 is held in the position to force oil to the circuit until the lift/flotation cylinders 14 are in the extended position, and the rake wheels 6 are lifted to the transport position shown in FIG. 6B.

After this first step of the charging procedure, the valve 39 is locked, isolating the lift/flotation cylinders 14 from direct connection to the tractor hydraulics. In the present embodiment for a fixed-frame rake 1 as shown in FIGS. 1 and 2, the accumulator 40 is biased so as to act like a compressive spring by plumbing it to the extend port of the lift/flotation cylinders 14, most clearly shown in FIG. 3. Thus, during this first step of the charging procedure, the tractor lifts the rake wheels 6 and pressurizes the accumulator 40. To complete the charging procedure the tractor remote valve 87 is opened to the tractor hydraulic fluid reservoir so that it does not force oil through the remote valve 87. This allows the oil to flow from the take-up cylinder 41 to the tractor hydraulic reservoir. Then the valve 39 is opened, either manually or electronically by the operator, to allow gravity to work against the accumulator 40 to lower the rake wheels 6 to the ground.

The hydraulic system pressure can be viewed on a pressure gauge (not shown) so that the operator can bleed the valve 39 to allow rake wheels 6 to press against the ground with appropriate pressure. This is done by pre-determining rake model-specific values for hydraulic system pressure at which the operator can close the valve 39 to maintain. The bias of the accumulator 40 to lift the rake wheels 6 keeps the rake wheels 6 from digging into the surface of the ground, yet is sufficiently small to allow gravity to press the rake wheels 6 against the surface and maintain continuous contact. The rake wheels are able to travel freely through a range of travel, typically starting at a normal operating position where the ground force is adjusted to a desired force, typically approximately 20 pounds. The rake wheels are typically able to move downward from that position approximately 4 inches and upward approximately 8 to 12 inches. Oil in the rake hydraulic system will constantly be seeking to occupy volume so as to obtain equilibrium pressures throughout the system. If the take-up cylinder valve 39 is locked, oil flow is restricted to flowing between the suspension cylinders 14 and the accumulator 40. Thus, with the valve 39 locked, the rake wheels 6 cannot be lifted or lowered via the tractor hydraulic system but only by the exchange of oil between the cylinders 14 and accumulator 40 as would be caused by variations in the force the ground exerts on the rake wheels 6 due to ground surface irregularity (shown in FIGS. 1 and 2) while raking As the rake 1 passes over uneven ground, the ground exerts changing forces on the rake wheels 6. The oil can flow between the cylinders 14 and the accumulator 40 to constantly maintain system pressure so that good contact between the rake wheels 6 and the ground is maintained.

Figure 4A:
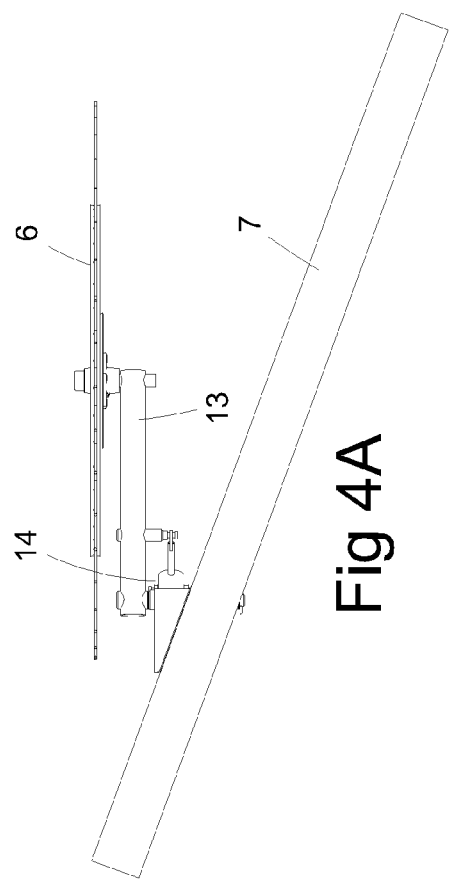
FIG. 4A is a top view of one of the rake wheels in an elevated raised position shown in FIG. 4B and showing how it is attached to a tool bar with a hydraulic cylinder suspension.
Figure 4C:
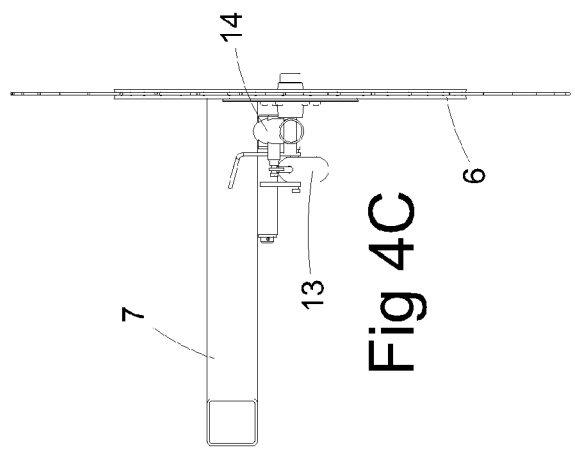
FIG. 4C is a view of the structure with the rake wheel in a raised position as shown in FIGS. 4A and 4B looking perpendicular to a plane in which the rake wheel lies.
Figure 4B:
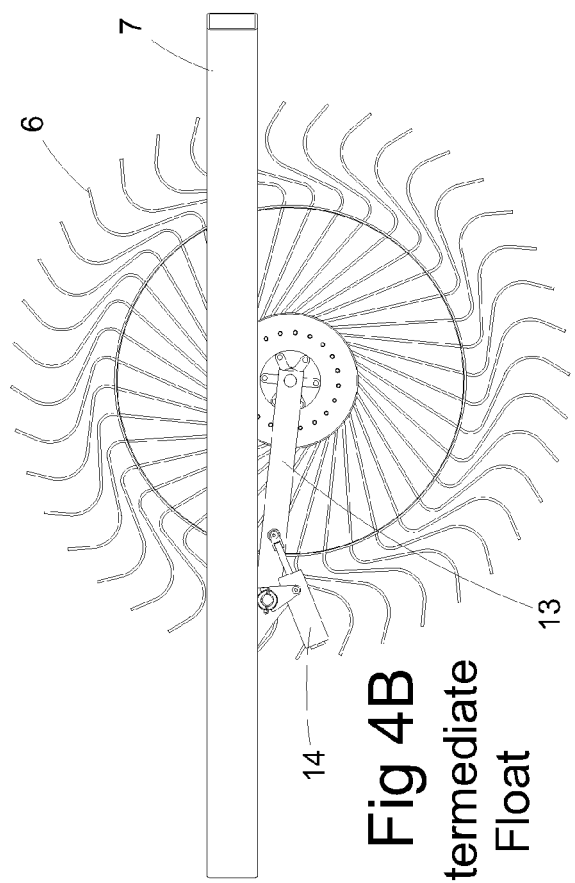
FIG. 4B is a side elevational view of the rake wheel in an "intermediate float" position shown in FIG. 4A and showing how the rake wheel and mounting arm and hydraulic cylinder are connected to the tool bar using the hydraulic cylinder.

FIGS. 4 through 8 illustrate an individual rake wheel, and flotation system in various positions. FIG. 8 is a representative position that may be observed in an operating position, in a static situation, on level ground. This is the most likely configuration that an operator would use to evaluate and adjust the flotation. Once set, FIGS. 4 and 5 represent positions that may be encountered during operation, when the wheel encounters a raised portion of the terrain. The rake wheels may be raised, for instance by approx 6 inches as shown in FIG. 4 and by approx 10 inches as shown in FIG. 5. The advantage of the present invention is that the variation in the ground force will be greatly reduced as compared to prior art rake wheel suspensions. It is desirable to minimize the variation. The preferred embodiment that is illustrated will provide a ground force that is at most 20% more in the highest operating position, shown in FIG. 5, as compared to the ground force that was set in the normal operating position, as shown in FIG. 8.

The present invention provides an additional benefit by allowing the rake wheel to move downward, as shown in FIG. 7, while maintaining a fairly consistent flotation force. The preferred embodiment as illustrated allows the rake wheel to move downward approximately 4 inches, while the ground force will be within 60% of the ground force in the operating position. The preferred embodiment further relies on the flotation cylinder to serve as a down-stop, when the cylinder is completely extended, the downward movement of the wheel is stopped.

In operation this suspension system provides advantages related to the durability of the rake wheels. Each rake wheel is comprised of a number to rake tines, typically including a wire rod. These rods are connected together in a variety of ways, but in all known cases the connection of the rake tines are known to be potential sources for failure. When the rake wheels are subjected to varying ground forces, the individual rake tines are also subjected to varying bending loads. The variation of bending loads contributes to the failure of the rake tines, thus a system that minimizes the variation of the ground force will have a beneficial affect on the durability of the rake tines.

In addition to the improved tine durability, the capability to provide a consistent ground force through an expanded range of travel, will result in improved raking action. The ground force on the individual rake wheels affects the way the rake tines engage the crop and ground. Higher ground forces tend to result in increased contamination of the crop material, as the tines also carry some dirt along with the crop material. Thus, a more consistent ground force will provide improved raking function.

Figure 9:
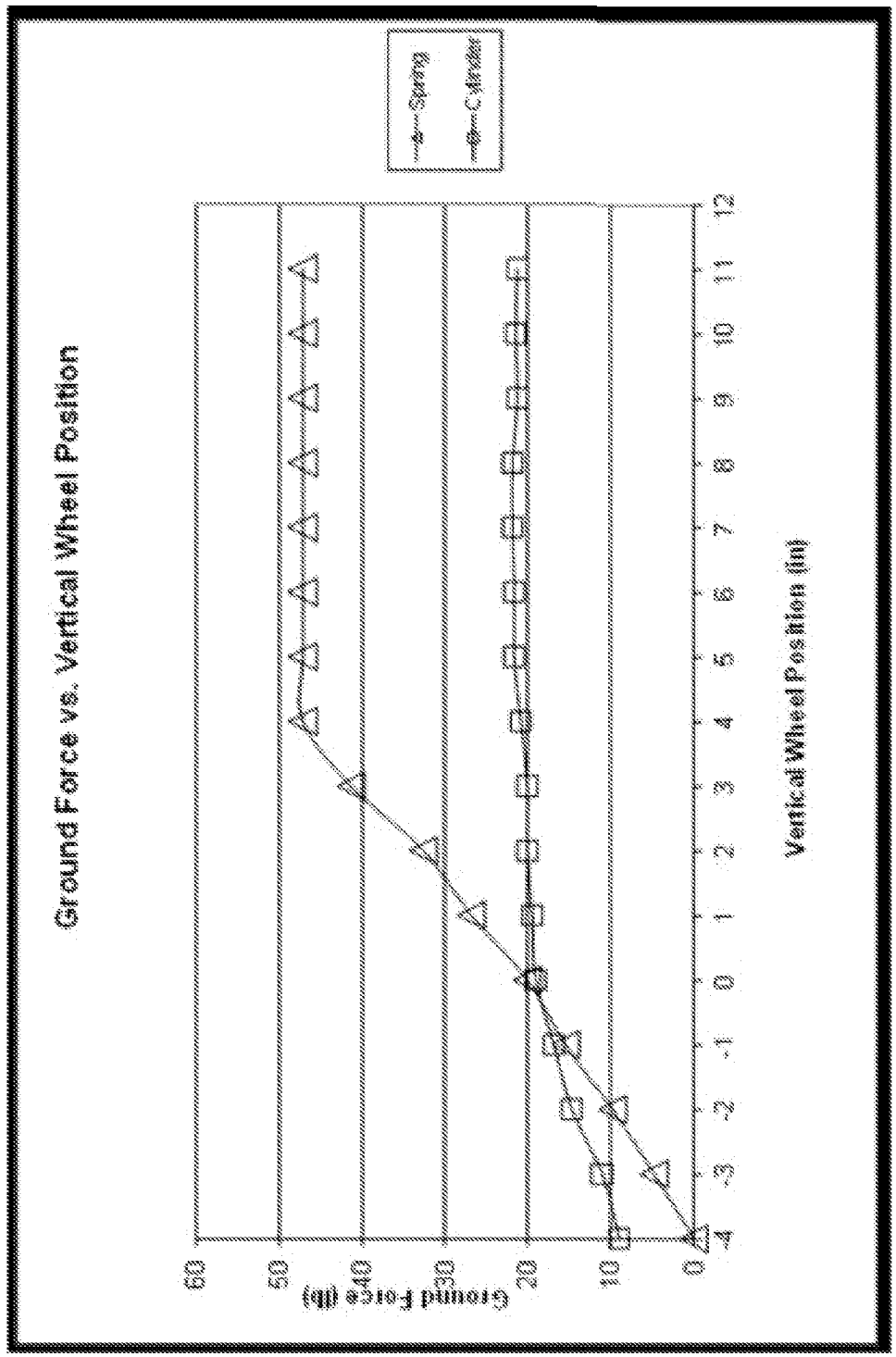

FIGS. 9 and 10 are related to each other and are graph charts showing the estimated approximate ground force verses vertical wheel pressure force to compare the present invention using a hydraulic cylinder as compared to a wheel rake using springs for the rake wheels.

The above embodiment is the current preferred embodiment, but this invention is clearly not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A rake apparatus comprising:
a plurality of rake wheels;
a tool bar;
a plurality of arms, each arm having a first end and a second end, the first end of each arm being operatively pivotally attached to the tool bar, each rake wheel being operatively rotatably attached to the second end of a corresponding arm;
a closed-loop hydraulic lift/flotation circuit comprising:
a hydraulic accumulator; and
a plurality of hydraulic lift/flotation cylinders, each hydraulic lift/flotation cylinder having a first part thereof operatively pivotally attached to the tool bar and a second part thereof operatively attached to an arm to carry a portion of the weight of the rake wheel and having a port, the hydraulic accumulator being fluidly connected to each hydraulic lift/flotation cylinder by its port, the hydraulic lift/flotation cylinder, port, and the accumulator being arranged to lift the rake wheel upon flow of hydraulic fluid from the accumulator to the port and the hydraulic cylinder.

2. The apparatus of claim 1, wherein each hydraulic lift/flotation cylinder has a first part thereof operatively pivotally attached to the tool bar and a second part thereof operatively attached to an arm to carry a portion of the weight of the rake wheel between:
a rake wheel first position with the rake wheel in a lowest operating position for contacting the ground with a first ground force;
a rake wheel second position with the rake wheel ten inches above the first rake wheel position for contacting the ground with a second ground force,
a difference between the first and second rake ground forces being less than 30 lbs.

3. The apparatus of claim 2 wherein each hydraulic lift/flotation cylinder has a first part thereof operatively pivotally attached to the tool bar and a second part thereof operatively attached to an arm to carry a portion of the weight of the rake wheel in a third, transport position.

4. The apparatus of claim 1, wherein each hydraulic lift/flotation cylinder is trunnion mounted.

5. The apparatus of claim 1, additionally comprising:
(a) a first valve for controlling the flow of hydraulic fluid from a source of pressurized hydraulic fluid; and
(b) a second valve for isolating the hydraulic accumulator from the source of pressurized hydraulic fluid.

6. The apparatus of claim 5 wherein each hydraulic lift/flotation cylinder is fluidly connected in series to the first valve.

7. The apparatus of claim 2 wherein the second position is limited by full extension of the hydraulic lift/flotation cylinder.

8. The apparatus of claim 1 wherein the closed-loop hydraulic lift/flotation circuit further comprises a take-up cylinder to control an oil volume of the hydraulic lift/flotation circuit displaced by lifting and lowering the rake wheels.

9. The apparatus of claim 1 wherein the apparatus includes a single up-stop, the up-stop being built into the hydraulic lift/flotation cylinder.

10. The apparatus of claim 1 wherein the cylinder is a one-way hydraulic lift/flotation cylinder.

11. The apparatus of claim 1 further comprising:
a rake frame attached to the tool bar; and
a tongue attached to the rake frame for towing the rake apparatus.

* * * * *

UNITED STATES PATENT AND TRADEMARK OFFICE
CERTIFICATE OF CORRECTION

PATENT NO. : 8,997,447 B2  Page 1 of 1
APPLICATION NO. : 13/350124
DATED : April 7, 2015
INVENTOR(S) : Michael Vaske et al.

It is certified that error appears in the above-identified patent and that said Letters Patent is hereby corrected as shown below:

Title page

Item (12), delete "Yaske et al." and insert -- Vaske et al. --.
Item (75), in Inventors, delete "Michael Yaske" and insert therefor -- Michael Vaske --.

Signed and Sealed this
Eighth Day of September, 2015

Michelle K. Lee
*Director of the United States Patent and Trademark Office*